US009513517B2

(12) United States Patent
Wu

(10) Patent No.: US 9,513,517 B2
(45) Date of Patent: Dec. 6, 2016

(54) LIQUID CRYSTAL PANEL, DISPLAY DEVICE, AND MANUFACTURING METHOD AND DRIVING METHODS THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Hao Wu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 259 days.

(21) Appl. No.: 14/386,190

(22) PCT Filed: Oct. 17, 2013

(86) PCT No.: PCT/CN2013/085355
§ 371 (c)(1),
(2) Date: Sep. 18, 2014

(87) PCT Pub. No.: WO2015/014024
PCT Pub. Date: Feb. 5, 2015

(65) Prior Publication Data
US 2016/0178976 A1    Jun. 23, 2016

(30) Foreign Application Priority Data

Jul. 29, 2013 (CN) .......................... 2013 1 0322620

(51) Int. Cl.
*G09G 3/36* (2006.01)
*G02F 1/1343* (2006.01)
(Continued)

(52) U.S. Cl.
CPC ....... *G02F 1/134363* (2013.01); *G02F 1/1368* (2013.01); *G02F 1/13439* (2013.01);
(Continued)

(58) Field of Classification Search
CPC ............ G02F 1/134363; G02F 1/13439; G02F 1/133514; G02F 1/133516; G02F 1/1368; G02F 1/136286; G02F 3/3696; G02F 1/136204; G02F 2001/136295; G02F 2001/134372; G09G 3/3648; G09G 2300/0426; G09G 2360/16; G09G 2300/0434

See application file for complete search history.

(56) References Cited

U.S. PATENT DOCUMENTS 7,298,445 B1    11/2007  Choi et al.
2004/0263749 A1  12/2004  Jeong et al.
(Continued)

FOREIGN PATENT DOCUMENTS

CN    1367479 A    9/2002
CN   101943829 A   1/2011
(Continued)

OTHER PUBLICATIONS

International Search Report Appln. No. PCT/CN2013/085355; Dated May 15, 2014.
(Continued)

*Primary Examiner* — Rodney Amadiz
(74) *Attorney, Agent, or Firm* — Ladas & Parry LLP

(57) ABSTRACT

A liquid crystal panel, a display device, and a manufacturing method and a driving method thereof are provided. The liquid crystal panel comprises an array substrate (20), a color filter substrate (10), and a liquid crystal layer (30) disposed between two substrates; the array substrate (20) is provided with a first electrode (21) and a second electrode (22)
(Continued)

thereon in different layers, the color filter substrate (10) is provided with a third electrode (12) and a fourth electrode (11) thereon in different layers, the first electrode (21) and the third electrode (22) are disposed opposite to each other, the first electrode (21) and the third electrode (12) are slit-like electrodes, the second electrode (22) and the fourth electrode (11) are plate-like electrodes, the first electrode (21) and the third electrode (12) are respectively located on sides close to the liquid crystal layer of the second electrode (22) and the fourth electrode (11). The driving method of a display device comprises: with regard to each frame of image, calculating and acquiring an average value of pixel voltages applied to pixel electrodes when the frame of image is shown, and applying the average value to the third electrode (12) or the fourth electrode (11) of the color filter substrate (10); or, in any one pixel region, the third electrode (12) is applied with a same signal as the first electrode (11), and the fourth electrode (11) is applied with a same signal as the second electrode (22).

16 Claims, 4 Drawing Sheets

(51) Int. Cl.
  *G02F 1/1335* (2006.01)
  *G02F 1/1362* (2006.01)
  *G02F 1/1368* (2006.01)
(52) U.S. Cl.
  CPC .. *G02F 1/133514* (2013.01); *G02F 1/133516* (2013.01); *G02F 1/136204* (2013.01); *G02F 1/136286* (2013.01); *G09G 3/3648* (2013.01); *G09G 3/3696* (2013.01); *G02F 2001/134372* (2013.01); *G02F 2001/136295* (2013.01); *G09G 2300/0426* (2013.01); *G09G 2300/0434* (2013.01); *G09G 2360/16* (2013.01)

(56) References Cited

U.S. PATENT DOCUMENTS

| 2011/0304787 A1 | 12/2011 | Wang et al. |
| 2013/0016294 A1 | 1/2013 | Li et al. |
| 2014/0104556 A1* | 4/2014 | Takagi ................. G02F 1/13306 349/143 |

FOREIGN PATENT DOCUMENTS

| CN | 102156359 A | 8/2011 |
| CN | 202563216 U | 11/2012 |
| CN | 103185993 A | 7/2013 |
| JP | 2000-187227 A | 7/2000 |

OTHER PUBLICATIONS

Written Opinion of the international Searching Authority Appln. No. PCT/CN2013/085355; Dated May 14, 2014.
Second Chinese Office Action issued Aug. 26, 2015; Appln. No. 201310322620.2.
Chinese Notice of Allowance; issued Dec. 7, 2015; Appln. No. 201310322620.2.
International Preliminary Report on Patentability Appln. No. PCT/CN2013/085355; Dated Feb. 2, 2016.
First Chinese Office Action Appln. No. 20130322620.2; Dated May 21, 2015.
International Search Report dated Apr. 29, 2014; PCT/CN2013/085355.

* cited by examiner

LIQUID CRYSTAL PANEL, DISPLAY DEVICE, AND MANUFACTURING METHOD AND DRIVING METHODS THEREOF

TECHNICAL FIELD

Embodiments of the present invention relate to a liquid crystal panel, a display device, and a manufacturing method and a display method thereof.

BACKGROUND

A planar field mode refers to a mode that the rotated orientation of liquid crystal is mainly driven by a parallel electric field, and comprises: an In-Plane Switching (IPS) mode and an Advanced-Super Dimensional Switching (ADS) mode. An ADS mode uses a parallel electric field generated by edges of pixel electrodes or common electrodes in the same plane and a vertical electric field formed between pixel electrodes and common electrodes to form a multi-dimension electric field to make liquid crystal molecules at all orientations in the liquid crystal cell undergo rotation switching, so that the work efficiency of planar orientation liquid crystal is improved and the light transmission efficiency is increased as well.

As illustrated by FIG. 1, an ADS liquid crystal display is formed by disposing an ADS array substrate 20 and a color filter substrate 10 opposite to each other with a liquid crystal layer 30 between the ADS array substrate and the color filter substrate. Generally, an ADS array substrate 20 comprises a substrate and a gate electrode metal layer, a gate insulating layer, an active layer, a source-drain electrode metal layer, a resin layer, a second electrode 22, an insulating protection layer, and a first electrode 21 that are sequentially formed on the substrate; the first electrode 21 comprises regular micrometer level strip electrodes, and the first electrode 21 and the second electrode 22 as a plate-like electrode cooperate to form a parallel electric filed to drive liquid crystal to deflect, so as to realize display function.

SUMMARY

Embodiments of the present invention provide a liquid crystal panel, a display device, and a manufacturing method and a driving method thereof, which can reduce the distribution difference of liquid crystal caused by a vertical electric field at the edge of the pixel and improve the optical display characteristics of the product.

An aspect of the present invention provides a liquid crystal panel, which comprises an array substrate, a color filter substrate and a liquid crystal layer disposed between the two substrates; the array substrate is provided with a first electrode and a second electrode thereon in different layers, and the color filter substrate is provided with a third electrode and a fourth electrode thereon in different layers; the first electrode and the third electrode are disposed opposite to each other, the first electrode and the third electrode are slit-like electrodes, the second electrode and the fourth electrode are plate-like electrodes, and the first electrode and the third electrode are separately located on one side close to the liquid crystal layer of the second electrode and the fourth electrode.

For example, a variation trend of a width of slit of the third electrode is contrary to that of the first electrode.

For example, the material and the technological parameters in the preparation of the third electrode and the first electrode are same, and the third electrode and the first electrode are manufactured by using a same mask plate and a same equipment.

For example, the first electrode and the second electrode on the array substrate are provided with a passivation layer therebetween, and the third electrode and the fourth electrode on the color filter substrate are provided with a second passivation layer therebetween; the second passivation layer and the passivation layer of the array substrate have a same material and technological parameters in preparation and are manufactured by using a same equipment.

For example, the fourth electrode and the second electrode have a same material and technological parameters in preparation and are manufactured by using a same equipment.

For example, the array substrate further comprises a thin film transistor, a gate line, and a data line; a gate electrode of the thin film transistor is connected with the gate line, a source electrode of the thin film transistor is connected with the data line, and a drain electrode of the thin film transistor is connected with the first electrode or the second electrode; the color filter substrate further comprises a second thin film transistor, a second gate line, and a data line; a gate electrode of the second thin film transistor is connected with the second gate line, a source electrode of the second thin film transistor is connected with the second data line, and a drain electrode of the second thin film transistor is connected with the third electrode or the fourth electrode.

For example, each of the thin film transistor and the second thin film transistor comprises a gate electrode, a gate insulating layer, a semiconductor layer, a source electrode and a drain electrode; the gate electrode of the second thin film transistor and the gate electrode of the thin film transistor have an identical material and the technological parameters in preparation and are manufactured by using a same equipment, and the gate insulating layer of the second thin film transistor and the gate insulating layer of the thin film transistor have an identical material and technological parameters in preparation and are manufactured by using a same equipment; the semiconductor layer of the second thin film transistor and the semiconductor layer of the thin film transistor have an identical material and technological parameters in preparation and are manufactured by using a same equipment, and the source electrode and the drain electrode of the second thin film transistor and the source electrode and the drain electrode of the thin film transistor have an identical material and technological parameters in preparation and are manufactured by using a same equipment.

For example, the layer where the fourth electrode is located has an antistatic effect.

Another aspect of the present invention provides a display device, which comprises any one of the above described liquid crystal panel.

For example, the display device further comprises a compensation driving circuit, which is configured to, with regard to each frame, calculate and acquire an average value of pixel voltages applied to every pixels when the frame of image is shown, and apply the average value to the third electrode or the fourth electrode; when the first electrode is a pixel electrode and the second electrode is a common electrode, the compensation driving circuit is connected with the third electrode of the color filter substrate and applies the average value to the third electrode; or when the second electrode is the pixel electrode and the first electrode is the common electrode, the compensation driving circuit is connected with the fourth electrode of the color filter substrate and applies the average value to the fourth electrode.

On another aspect, the present invention further provides a manufacturing method of a display device, comprising: forming an array substrate, wherein the array substrate is provided with a first electrode and a second electrode thereon in different layers, the first electrode is a slit-like electrode, the second electrode is a plate-like electrode, and the first electrode is located on the side close to the liquid crystal layer of the second electrode; forming an color filter substrate, wherein the color filter substrate is sequentially provided with a third electrode and a fourth electrode, the third electrode is a slit-like electrode, the fourth electrode is a plate-like electrode, and the third electrode is separately located on the side close to the liquid crystal layer of the fourth electrode; and cell-assembling the color filter substrate and the array substrate.

For example, forming the color filter substrate, comprising: adopting a same material and technological parameters as the first electrode of the array substrate and using a same mask plate and a same equipment to form the third electrode.

For example, the first electrode and the second electrode on the array substrate are provided with a passivation layer therebetween, and the third electrode and the fourth electrode on the color filter substrate are provided with a second passivation layer therebetween; the process of forming the color filter substrate, comprising: adopting a same material and technological parameters and using a same equipment to form the second passivation layer and the passivation layer of the array substrate.

For example, the process of forming the color filter substrate, comprising: adopting a same material and technological parameters with the second electrode of the array substrate and using a same equipment to form the fourth electrode.

For example, the array substrate further comprises: a thin film transistor, a gate line, and a data line; a gate electrode of the thin film transistor is connected with the gate line, a source electrode of the thin film transistor is connected with the data line, and a drain electrode of the thin film transistor is connected with the first electrode or the second electrode; the color filter substrate further comprises: a second thin film transistor, a second gate line, and a second data line; a gate electrode of the second thin film transistor is connected with the second gate line, a source electrode of the second thin film transistor is connected with the second data line, and a drain electrode of the second thin film transistor is connected with the third electrode or the fourth electrode; the process of Ruining the color filter substrate, further comprising: adopting a same material and technological parameters as the gate electrode of the array substrate and using a same equipment to form the gate electrode of the second thin film transistor; adopting a same material and technological parameters as the gate insulating layer of the array substrate and using a same equipment to form the gate insulating layer of the second thin film transistor; adopting a same material and technological parameters as the semiconductor layer of the array substrate and using a same equipment to form the semiconductor layer of the second thin film transistor; adopting a same material and technological parameters as the source electrode and the drain electrode of the array substrate and using a same equipment to form the source electrode and drain electrode of the second thin film transistor.

Another aspect of the present invention further provides a driving method of the display device; where the first electrode is a pixel electrode and the second electrode is a common electrode, the method comprises: acquiring a common voltage, and applying the common voltage to a fourth electrode of the color filter substrate; with regard to each frame of image, calculating and acquiring an average value of pixel voltages applied to every pixel electrodes when the frame of image is shown, and applying the average value to a third electrode of the color filter substrate; or where the first electrode is a common electrode and the second electrode is a pixel electrode, the method comprises: acquiring a common voltage, and applying the common voltage to a third electrode of the color filter substrate; with regard to each frame of image, calculating and acquiring an average value of pixel voltages applied to every pixel electrodes when the frame of image is shown, and applying the average value to a fourth electrode of the color filter substrate.

Another aspect of the present invention further provided another driving method of the display device, and the color filter substrate of the display device is provided with a second thin film transistor, a second gate line, and a second data line; a gate electrode of the second thin film transistor is connected with the second gate line, a source electrode of the second thin film transistor is connected with the second data line, and a drain electrode of the second thin film transistor is connected with the third electrode or the fourth electrode; the method comprises: within any one of the pixel regions, the third electrode is applied with a same signal as the first electrode, and the fourth electrode is applied with a same signal as the second electrode.

Embodiments of the present invention provide a liquid crystal panel, a display device, and a manufacturing method and a driving method thereof, which can decrease the vertical portion in the driving electric field and reduce the distribution difference of liquid crystal caused by the vertical electric field at the edge of the pixel in the existing product and make the liquid crystal molecules in the liquid crystal cell be arranged more regularly, so as to solve a series of visual defects caused by arrangement difference of some liquid crystal molecules, and improve the optical display characteristics of product.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DRAWING REFERENCE NUMBERS

10—color filter substrate; 11—fourth electrode; 12—third electrode; 13—second passivation layer; 20—array substrate; 21—first electrode; 22—second electrode; 23—passivation layer; 30—liquid crystal layer; 210—gate line; 211—data line; 212—thin film transistor; 100—display panel; 300—compensation driving circuit.

DETAILED DESCRIPTION

Figure 1:
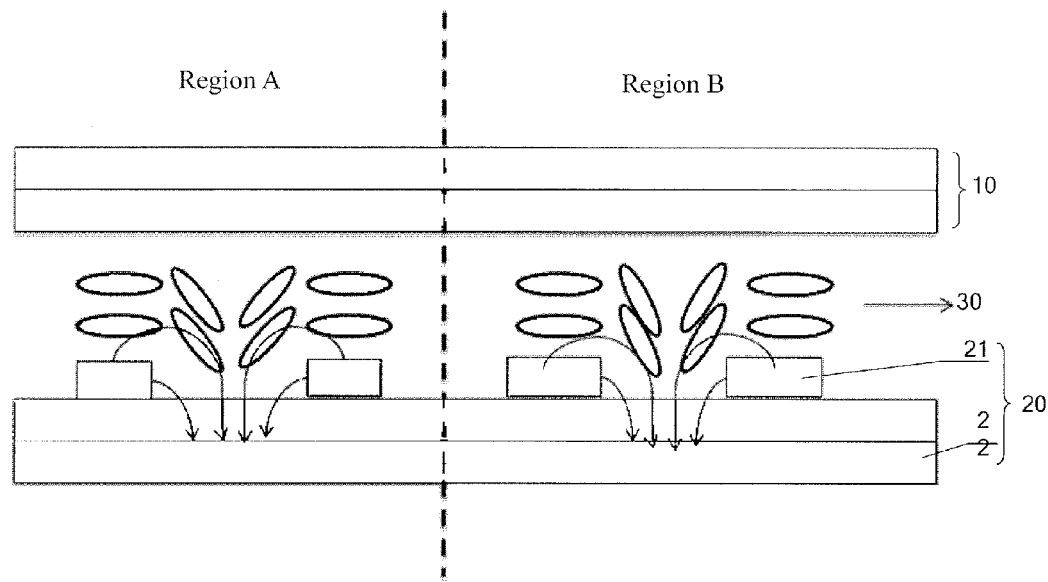
FIG. 1 is a structural schematic diagram of a traditional ADS display.

The inventors find that the traditional technology as illustrated by FIG. 1 at least has the following problems: in the process of manufacturing an array substrate, in the different regions on the glass substrate (mother board) which is used to prepare multiple array substrates at the same time, although the characteristic parameters (such as layer thickness and line width) across each layer are the same in design, it is hard to guarantee the characteristic parameters of each layer be completely uniform when the layer is finally formed, especially, the center region and the corner regions have large difference from the other regions, and distribution defects appear. One of the main features of the above-mentioned distribution defects is that: on the same glass substrate, it is hard for the sizes of first electrodes 21 (strip electrodes) to be completely uniform, thus as a result the electric field distributions are different from each among different display panels (array substrates of which correspond to different regions of the same glass substrate). Due to the requirements of economy and mass production, the circuit adjusting codes used by the different display panels are the same, which transfers the difference of transmittance at the center and corner regions of the same glass substrate to the final products and brings about fluctuation in transmittance among the different display panels. On the other aspect, because the second electrode and the first electrode have a step difference in height, which makes the two layers of electrodes unavoidably forms a vertical electric field therebetween and affects the distribution of the liquid crystal at the edge of the pixel. Both the above-mentioned aspects heavily affect the optical characteristics of the products.

Embodiments of the present invention provide a liquid crystal panel, a display device, and a manufacturing method and a driving method thereof, which can reduce the distribution differences of liquid crystal caused by a vertical electric field at the edges of a pixel and improve the optical display characteristics of the product.

Embodiments of the present invention are particularly described as follows with reference to the accompanying drawings. The specific embodiments described here are only used to explain the present invention and are not limitative of the present invention.

First Embodiment

Figure 2:
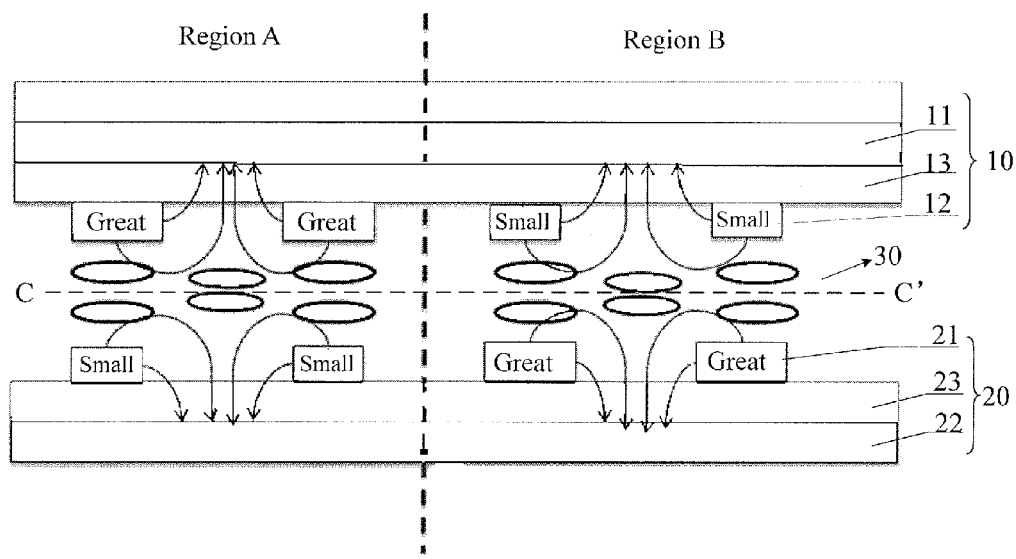
FIG. 2 is a structural schematic diagram of a liquid crystal panel provided by a first embodiment of the present invention.

As illustrated by FIG. 2, the present embodiment provides a liquid crystal panel, which comprises an array substrate 20, a color filter substrate 10 and a liquid crystal layer 30 disposed between the two substrates. The array substrate 20 is provided with a first electrode 21 and a second electrode 22 thereon in different layers, and the color filter substrate 10 is provided with a third electrode 12 and a fourth electrode 11 thereon in different layers. The first electrode 21 and the third electrode 12 are disposed opposite to each other, both the first electrode 21 and the third electrode 12 are slit-like electrodes, and both the second electrode 22 and the fourth electrode 11 are plate-like electrodes. The first electrode 21 and the third electrode 12 are respectively located on sides close to the liquid crystal layer 30 of the second electrode 22 and the fourth electrode 11.

When the color filter substrate 10 and the array substrate 20 are disposed opposite to each other to form a liquid crystal cell (cell-assembly), taking the central line CC' of the liquid crystal layer 30 as a reference, CC' line is a central line of the gap (cell gap) of the color filter substrate 10 and the array substrate 20, the third electrode 12 is located at the mirror position of the first electrode 21, a second passivation layer 13 is located at the mirror position of a passivation layer 23, the fourth electrode 11 is located at the mirror position of the second electrode 22, and in addition, the components of an electric field generated by the third electrode 12 and the fourth electrode 11 and an electric field generated by the first electrode 21 and the second electrode 22 have the inverse directions in the vertical substrate direction (i.e., the longitudinal direction in FIG. 2).

In any one of the pixel regions, the fourth electrode 11 on the color filter substrate 10 corresponds to the second electrode 22 on the array substrate 20, and the fourth electrode 11 is located at the mirror position of the second electrode 22; the third electrode 12 on the color filter substrate 10 corresponds to the first electrode 21 on the array substrate 20, and the third electrode 12 is located at the mirror position of the first electrode 21. In this way, in any one of the pixel regions, an electric field generated by the third electrode 12 and the fourth electrode 11 and an electric field generated by the first electrode 21 and the second electrode 22 have the vertical components with inverse directions, which can preferably weaken the vertical portion in the driving electric field, reduce the distribution difference of liquid crystal, and further improve the visual effect of the product.

The liquid crystal panel in the present embodiment is applicable for a planar field mode; a planar field mode refers a mode that the driving electric field of the liquid crystal is mainly a parallel electric field, both the pixel electrode and common electrode forming the driving electric field are disposed on the array substrate 20; the liquid crystal panel may be an IPS mode and also may be an ADS mode.

In the present embodiment, the color filter substrate 10 cell-assembled with the array substrate 20 is provided with a fourth electrode layer 11 and a third electrode 12 thereon in different layers, and the array substrate 20 is provided with a first electrode 21 and a second electrode 22 thereon in different layers. An electric field formed by the third electrode 12 and the fourth electrode 11 and an electric field formed by the first electrode 21 and the second electrode 22 have the vertical components with inverse directions, which can weaken the vertical portion in the driving electric field, reduce the distribution difference of liquid crystal caused by the vertical electric field at the edge of the pixel, and make the liquid crystal molecules in the liquid crystal cell arrange more regularly, so as to solve the visual defects caused by the orientation difference of some liquid crystal molecules and improve the optical display characteristics of the product.

Further preferably, for example, the variation trend of the width of slit of the third electrode 12 is contrary to that of the first electrode 21.

In a preferable embodiment, the characteristic parameters forming the third electrode 12 and first electrode 21 possess consistent distributional trends therebetween, and the distribution defects of the characteristic parameters (comprising but not limited to the width of slit) also possess consistency. After cell-assembling, the characteristic parameters of the third electrode 12 and the characteristic parameters of the first electrode 21 possess the inverse variation trends. For example, representatively, the variation trend of the width of slit of the third electrode 12 is contrary to that of the first electrode 21.

Figure 3:
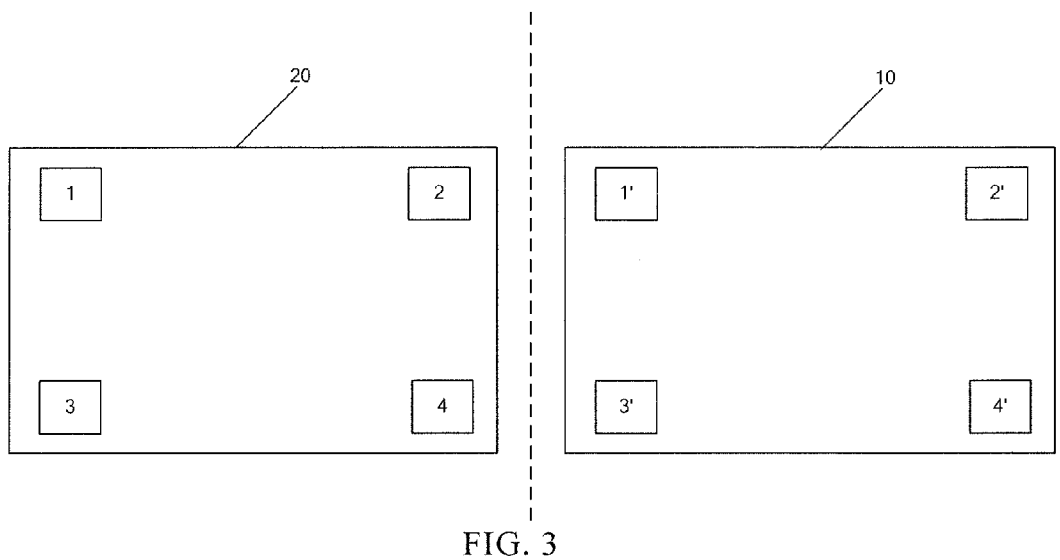
FIG. 3 is schematic diagram one of the cell-assembly of an array substrate and a color filter substrate in the first embodiment of the present invention.
Figure 4:
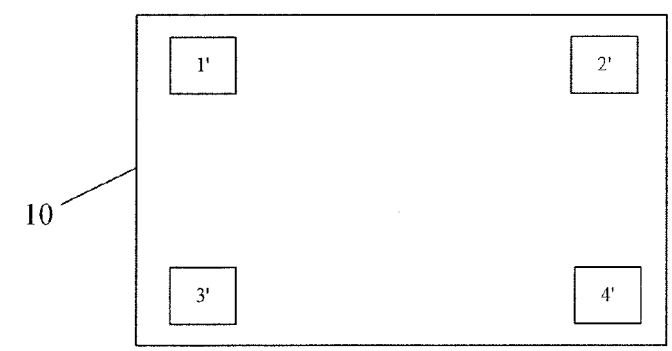
FIG. 4 is schematic diagram two of the cell-assembly of an array substrate and a color filter substrate in the first embodiment of the present invention.
Figure 4:
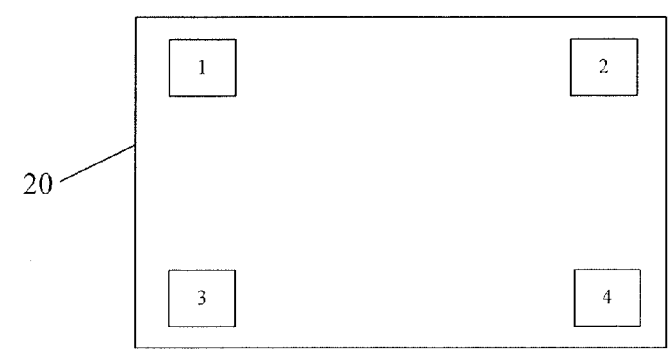

For example, because of the problems of the manufacturing process, the third electrode 12 and the first electrode 21 present the phenomenon that the electrode is too big or too small (correspondingly, the width of slit also presents the phenomenon that it is too wide or too narrow), for example, as illustrated by FIG. 3 and FIG. 4, both the region 1 of the array substrate 20 and the region 1' of the color filter substrate 10 present the phenomenon that the electrode is too big, and both the region 2 of the array substrate 20 and the region 2' of the color filter substrate 10 present the phenomenon that the electrode is too small.

When the array substrate 20 and the color filter substrate 10 are cell-assembled to form a liquid crystal cell, there are two methods as illustrated by FIG. 3 and FIG. 4; the first method is illustrated by FIG. 3, performing the cell-assembly along the imaginary line AA' parallel to the short edge of the array substrate 20, and after the cell-assembly of the array substrate 20 and the color filter substrate 10 along the direction of the imaginary line AA', the region 1 of the array substrate 20 corresponds to the region 2' of the color filter substrate 10, the region 2 of the array substrate 20 corresponds to the region 1' of the color filter substrate 10, the region 3 of the array substrate 20 corresponds to the region 4' of the color filter substrate 10, and the region 4 of the array substrate 20 corresponds to the region 3' of the color filter substrate 10. After cell-assembly, the trends of the distribution defects of the characteristic parameters of the third electrode 12 and the first electrode 21 are contrary to each other, which has a complementary effect as illustrated by FIG. 2; i.e., when any one region on the array substrate 20 presents the situation that the first electrode 12 is too big or too small, the third electrode 12 of the corresponding region on the color filter substrate 10 must have the inverse consequence. After the electric field effects of the array substrate 20 and the color filter substrate 10 is synthesized, as illustrated by the region A and the region B in FIG. 2, finally, the deflections of the liquid crystal molecules will become more stable, which does not generate large electric field differences which occurs because of the distribution defects of the technological parameters and optimizes the distributional characteristics of the products and the visual display effect; meanwhile, the electric field between the third electrode 12 and the fourth electrode and the electric field between the first electrode 21 and the second electrode 22 have vertical components in the inverse directions, so that the vertical portion in the driving electric field is weaken, which reduces the distributional differences of liquid crystal caused by a vertical electric field appeared at the edges of the pixel in the existing product and makes the liquid crystal molecules in the liquid crystal arrange more regularly, and therefore solves a series of visual defects caused by the orientation difference of some liquid crystal molecules and improves the optical display characteristic of the product.

There are two cell-assembling methods as illustrated by FIG. 3 and FIG. 4 to cell-assemble the array substrate 20 and the color filter substrate 10 to form a liquid crystal cell: for example, the variation trends of the characteristic parameters of the region 2' on the color filter substrate 10 and the region 2 on the array substrate 20 are consistent with each other, and the variation trends of the characteristic parameters of the region 4 and the region 4' are consistent with each other; taking the cell-assembling method as illustrated by FIG. 3 as an example, the right end where the region 2' and the region 4' located on the color filter substrate 10 is opposite to the right end where the region 2 and the region 4 on the array substrate 20. After cell-assembling along the imaginary line AA', the region 2 is opposite to the region 1', the region 1 is opposite to the region 2', the region 3 is opposite to the region 4', and the region 4 is opposite to the region 3', so that the distribution defects of the technological parameters along the length direction can be compensated.

It should be noted that the factors affecting the distribution defects of the technological parameters are various and not easy to determine; in practice, generally the variation trends of the technological parameters along the length direction and the width direction of the array substrate 20 are separately measured by experiments in advance. If the consequence is that the distribution defects of the technological parameters along the length direction are bigger, then the cell-assembling method as illustrated by FIG. 3 can be adopted to offset (or compensate) the distribution defects of the technological parameters along the length direction; if the consequence is that the distribution defects of the technological parameters along the width direction are bigger, the cell-assembling method as illustrated by FIG. 4 can be adopted to offset (or compensate) the distribution defects of the technological parameters along the width direction. Certainly, it can be directly tested by experiment to determine which one of the liquid crystal cells formed in the cell-assembling methods as illustrated by FIG. 3 and FIG. 4 has a better display effect, and the same cell-assembling method can be used when the liquid crystal cell is produced in a large scale later.

Preferably, for example, the layer where the fourth electrode is located further has an antistatic effect, or the layer where the fourth electrode is located is directly provided as an antistatic layer.

Generally speaking, in order to prevent the static affecting display effect, the color filter substrate is provided with a layer of transparent conductive film as an antistatic layer for the function of static shielding. The fourth electrode in the present embodiment can directly use the existing antistatic layer, which can simplify the manufacturing processes of the color filter substrate.

Alternatively, for example, a fourth electrode also can be disposed on the color filter substrate, and the layer where the fourth electrode is located is connected with a constant voltage source, so as to make the layer where the fourth electrode is located further has an antistatic effect at the same time.

The liquid crystal panel of the present embodiment is used for a planar field mode display device; the fourth electrode and the third electrode are disposed on the color filter substrate, which are used to reduce the distributional difference of the electric field caused by manufacturing processes, so as to make the electric fields of the display panels corresponding to the corner regions of a glass substrate more stable and controllable; it also weakens the vertical portion in the driving electric field at the same time, reduces the distribution difference of liquid crystal caused by the vertical electric field at the edge of the pixel in the existing product, and makes the liquid crystal molecules in the liquid crystal cell arrange more regular, and solves a series of visual defects caused by the distributional difference of some liquid crystal molecules and improves the optical display characteristics of the product.

Second Embodiment

The present embodiment provides a liquid crystal panel, and the difference from the first embodiment lies in that, as illustrated by FIG. 1, a first electrode 21 and a second electrode 22 on an array substrate 20 are provided with a passivation layer 23 therebetween, a third electrode 12 and a fourth electrode 11 on the color filter substrate 10 are provided with a second passivation layer 13 therebetween. Besides, the second passivation layer 13 on the color filter substrate 10 and the passivation layer 23 on the array substrate comprise the same material, have technological parameters in preparation, and are manufactured by using a same equipment, so that the second passivation layer 13 has the consistent trend of distribution defects (mainly the variation of the thickness of the passivation layer) with the passivation layer 23. After cell-assembling, the passivation layer 13 and the passivation layer 23 have the inverse distribution defects (the cell-assembling method refers to the first embodiment and FIGS. 3 and 4), which can compensate the distributional differences of electric fields caused by the distribution defects of technological parameters when the first electrode 21 and the passivation layer 23 on the array substrate are being formed Third Embodiment The present embodiment provides a liquid crystal panel, and the differences from the first embodiment lies in that, as illustrated by FIG. 2, a fourth electrode 11 and a second electrode 22 of an array substrate 20 have the same material and technological parameters in preparation and are manufactured by using the same equipment, so that the prepared fourth electrode 11 possess the consistent trend of distribution defects with that of the second electrode 22. The cell-assembled liquid crystal panel is illustrated by FIG. 2, the fourth electrode 11 and the second electrode 22 have the inverse trends of distribution defects, which can compensate the distributional difference of the electric fields caused by the distribution defects of the technological parameters of the first electrode 21 and the second electrode 22 and improve the display effect of the product.

Fourth Embodiment

The present embodiment provides a liquid crystal panel, and the difference from the first embodiment lies in that, as illustrated by FIG. 2, a second passivation layer 13 on a color filter substrate 10 and a passivation layer on an array substrate 10 have the same material and technological parameters in preparation and are manufactured by using the same equipment. Besides, a fourth electrode 11 on the color filter substrate 10 and a second electrode 22 on the array substrate have the same material and technological parameters and are manufactured by using the same equipment, which can compensate the electric filed distributional difference caused by the distributional defects of the technological parameters of the second electrode 22, the passivation layer 23, and the first electrode 21 and improve the display effect of the product.

The present embodiment further provides a first indium tin oxide (ITO) layer (a fourth layer 11), an insulating protection layer (a second passivation layer 13) and a second ITO layer (a third electrode 12) on the color filter substrate in design, the structures of which (comprising material, thickness, design size, and so on) are still consistent with a first ITO layer (a second electrode 22), an insulating protection layer (a passivation layer 23) and a second ITO layer (a first electrode) of an array substrate 20 below; a liquid crystal cell can be formed by dripping liquid crystal after cell-assembly of the color filter substrate 10 and the array substrate 20; this process is mature, which will not be repeated here.

Fifth Embodiment

Figure 5A:
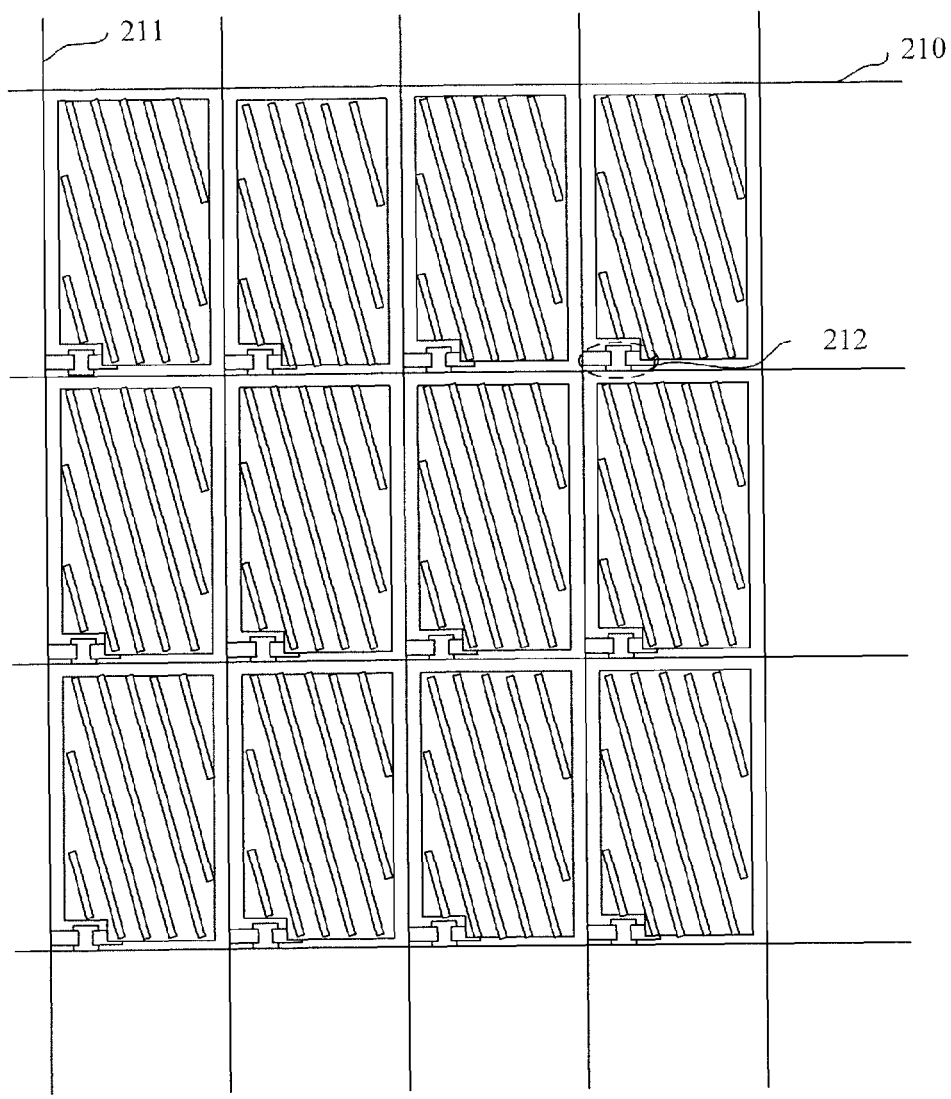
FIG. 5A is a structural schematic diagram of an array substrate of an embodiment of the present invention.
Figure 5B:
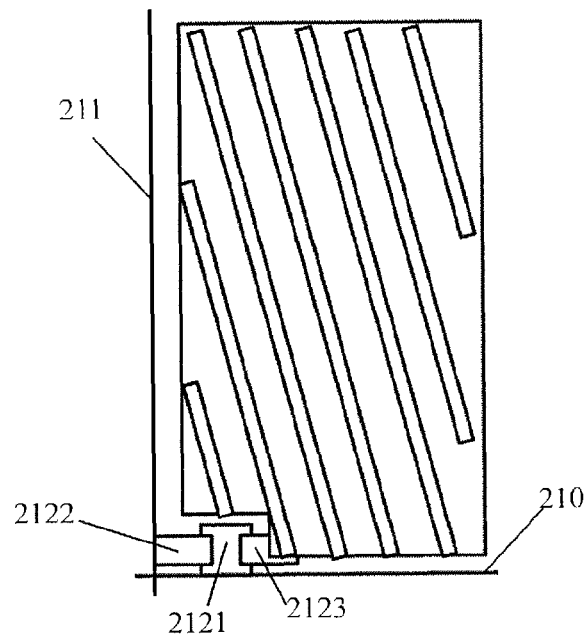
FIG. 5B is a enlarged schematic diagram of a pixel region.

The present embodiment provides a liquid crystal panel, and the difference from the fourth embodiment lies in that, as illustrated by FIG. 5A, an array substrate 20 further comprises: thin film transistors 212, gate lines 210, and data lines 211; the gate lines 210 and the data lines 211 cross with each other to define a plurality of pixel regions. As illustrated by FIG. 5B, in each pixel region, a gate electrode 2121 of the thin film transistor 212 is connected with the corresponding gate line 210, a source electrode 2122 of the thin film transistor is connected with the corresponding data line 211, and a drain electrode 2123 of the thin film transistor is connected with the first electrode or the second electrode in the pixel region, so that the first electrode and the second electrode can be applied with a pixel voltage from the data line.

Similarly, the color filter substrate 10 further comprises: second thin film transistors, second gate lines, and second data lines; the second gate lines and the second data lines cross with each other to define a plurality of second pixel regions. In each second pixel region, a gate electrode of the second thin film transistor is connected with the second gate line, a source electrode of the second thin film transistor is connected with the second data line, and a drain electrode of the second thin film transistor is connected with the third electrode or the fourth electrode in the second pixel region; so that the third electrode or the fourth electrode may be applied with a pixel voltage from the second data line. Further, when the array substrate 20 and the color filter substrate 10 are cell-assembled with each other, the pixel regions on the array substrate 20 and the second pixel regions on the color filter substrate 10 correspond to each other in the vertical direction.

In any one of the pixel regions, the third electrode may be applied with a signal the same as the first electrode, the fourth electrode may be applied with a signal the same as the second electrode, and thus the electric field distributional difference caused by the manufacturing process can be reduced and the electric field of the display panels corresponding to the corner regions of a glass substrate can be made more stable and controllable; meanwhile, the vertical component in the driving electric filed can be largely weaken, the distributional difference of liquid crystals caused by the vertical electric fields at the edge of the pixel in the existing product can be reduced, and the liquid crystal molecules in the liquid crystal cell can be arranged more regularly, so that a series of visual defects caused by orientation difference of some liquid crystal molecules can be solved and the optical display characteristics of the product can be improved.

Furthermore, both the thin film transistors and the second thin film transistors each may comprise: a gate electrode, a gate insulating layer, a semiconductor layer, a source electrode, and a drain electrode; the gate electrode of the second thin film transistor and the gate electrode of the thin film transistor have the same material and technological parameters in preparation and are manufactured by using the same equipment; the gate insulating layer of the second thin film transistor and the gate insulating layer of the thin film transistor have the same material and technological parameters in preparation and are manufactured by using the same equipment; the semiconductor layer of the second thin film transistor and the semiconductor layer of the thin film transistor have the same material and technological parameters in preparation and are manufactured by using the same equipment; the source electrode and drain electrode of the second thin film transistor and the source electrode and drain electrode of the thin film transistor have the same material and technological parameters in preparation and are manufactured by using the same equipment.

Except for the possible color filer layer, each of the rest layers on the color filter substrate is identical with that on the array substrate; the fourth electrode on the color filter substrate is designed to compensate every pixel through a manner that every pixel signal become controllable via a gate line, a date line and a TFT device (the same as the first electrode of the array substrate), and the compensation effect is better. The color filer layer, for example, comprises color filter units corresponding to all the pixel regions, and each color filter unit may be a red (R), a green (G), or a blue (B) color filter unit.

The present embodiment disposes electrodes and thin film transistors on the color filter substrate, and thus can reduce the electric field distributional differences, weaken the vertical component in the driving electric field, reduce the distributional difference of liquid crystals caused by the vertical electric field at the edge of the pixel in the existing product, and make the liquid crystal molecules in the liquid crystal cell be arranged more regularly, so that a series of visual defects caused by orientation difference of some liquid crystal molecules can be solved and the optical display characteristics of the product can improved.

Sixth Embodiment

Figure 6:
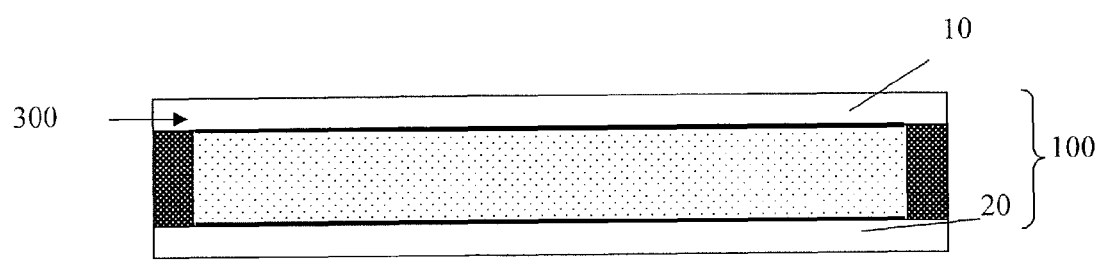
FIG. 6 is a structural schematic diagram of a display panel of an embodiment of the present invention.

The present embodiment provides a liquid crystal panel, and the difference from the first embodiment lies in that, as illustrated by FIG. 6, besides a color filter substrate 10 and an array substrate 20, the liquid crystal panel 100 further comprises: a compensation driving circuit 300, which is used to, with regard to each frame of image, calculate and acquire an average value of the pixel voltages applied to every pixel electrode when the image frame is shown and apply the average value to a third electrode or a fourth electrode of the color filter substrate.

When the first electrode is pixel electrode and the second electrode is a common electrode, the compensation driving circuit 300 is connected with the third electrode of the color filter substrate 10 and applies the average voltage to the third electrode; when the second electrode is a pixel electrode and the first electrode is a common electrode, the compensation driving circuit 300 is connected with the fourth electrode of the color filter substrate 10 and applies the average value to the fourth electrode.

For example, when a frame of image is displayed, the compensation driving circuit detects that most of the pixel voltages are about 5V by calculating, and then the compensation driving circuit applies a signal of 5V to the fourth electrode on the color filter substrate. As illustrated by FIG. 2, at this time, the liquid crystal molecules in the cell are affected by the upper and lower electric fields; the directions of the two electric fields are the same in the horizontal direction, which can enhance the driving effect upon the liquid crystal molecules and the two electric fields have an offsetting function in the vertical direction, so as to reduce the phenomenon that the liquid crystal molecules at edges are aligned irregularly because of the vertical electric field in the traditional product.

Seventh Embodiment

The present embodiment further provides a display device, which comprises a liquid crystal panel in any one of the embodiments above-mentioned. The display device may be any product or component with a display function such as a liquid crystal panel, an electronic paper, a cell phone, a panel computer, a television, a display, a notebook PC, a digital photo frame, and a navigator.

The display device of the present embodiment can reduce the electric field distributional differences caused by the manufacturing process, make the electric fields of the display panels at the corner regions of the glass substrate more stable and controllable, and meanwhile, can weaken the vertical component in the driving electric filed, reduce the distributional difference of liquid crystals caused by the vertical electric fields at the edge of the pixel in the existing product, and make the liquid crystal molecules in the liquid crystal cell be arranged more regularly, so as to solve a series of visual defects caused by orientation difference of some liquid crystal molecules and improve the optical display characteristics of the product.

Eighth Embodiment

The present embodiment further provides a manufacturing method of a display device, and the method may be conducted as follows.

101, Conducting a process of forming an array substrate, wherein the array substrate is provides with a first electrode and a second electrode thereon in different layers, the first electrode is a slit-like electrode, the second electrode is a plate-like electrode, and the first electrode is located at one side, close to a liquid crystal layer, of the second electrode;

102, Conducting a process of forming a color filter substrate, wherein the color filter substrate is sequentially provided with a third electrode and a fourth electrode thereon, besides, the third electrode is a slit-like electrode, the fourth electrode is a plate-like electrode, and the third electrode is separately located at one side, close to the liquid crystal layer, of the fourth electrode;

103, Cell-assembling the color filter substrate and the array substrate.

Step 101 of the present embodiment may be same as the step of preparing the array substrate in a traditional technology, and will not be repeated; step 102 further comprises a step of sequentially disposing a fourth electrode, a second passivation layer, and a third electrode on the color filter substrate. In a manufacturing process of an exemplary technology, when the fourth electrode, the second passivation layer, and the third electrode are formed, the whole processes such as exposure, development, and etching are conducted for both the array substrate and the color filter substrate; the two substrates pass through the same equipments, so the trends of the manufactured distributional defeats are basically same. Step 103 may be approximately same as a traditional technology, except for adopting the cell-assembling manner illustrated in FIG. 3 or FIG. 4, which is detailed in the first embodiment and will not be repeated here.

For example, step 102 of conducting a process of forming a color filter substrate comprises: adopting the same material and technological parameters as the first electrode on the array substrate and using the same equipment to form the third electrode.

For example, the first electrode and the second electrode on the array substrate are provided with a passivation layer therebetween, the third electrode and the fourth electrode on the color filter substrate are provided with a second passivation layer therebetween; step 102 of conducting a process of forming the color filter substrate may comprise: adopting the same material and technological parameters and using the same equipment to form the second passivation layer as the passivation layer of the array substrate.

For example, step 102 of conducting the process of forming the color filter substrate may comprise: adopting the same material and technological parameters as the second electrode on the array substrate and using the same equipment to form the fourth electrode.

For example, the array substrate may further comprise: a thin film transistor, a gate line, and a data line; a gate electrode of the thin film transistor is connected with the gate line, a source electrode of the thin film transistor is connected with the data line, a drain electrode of the thin film transistor is connected with the first electrode or the second electrode (specifically, the drain electrode of the thin film transistor is connected with the pixel electrode out of the first electrode and the second electrode); step 102 of conducting the process of forming the color filter substrate, for example, further comprises: adopting the same material and technological parameters as the gate electrode of the array substrate and using the same equipment to form the gate electrode of the second thin film transistor; adopting the same material and technological parameters as the gate insulating layer of the array substrate and using the same equipment to form the gate insulating layer of the second thin film transistor; adopting the same material and technological parameters as the semiconductor layer of the array substrate and using the same equipment to form the semiconductor layer of the second thin film transistor; adopting the same material and technological parameters as the source electrode and the drain electrode of the array substrate and using the same equipment to form the source electrode and the drain electrode of the second thin film transistor.

For example, step 103 of cell-assembling the color filter substrate and the array substrate may comprise: cell-assembling the color filter substrate and the array substrate, and make one end of the color filter substrate in the length direction be opposite to another end of the array substrate not corresponding thereto in the length direction. The color filter substrate and the array substrate are disposed opposite with each other, the periphery is bonded via a sealant, and spacers are formed or provided between the two substrates. After the cell-assembly of the two substrates, if necessary, a cutting process can be conducted.

The manufacturing method of the display device of the present embodiment can reduce the electric field distributional difference caused by the manufacturing process, make the electric fields of the display panels corresponding to the corner regions of the glass substrate more stable and controllable, and meanwhile, can weaken the vertical component in the driving electric field, reduce the distributional difference of liquid crystals caused by the vertical electric field at the edge of the pixel in the existing product, and make the liquid crystal molecules in the liquid crystal cell arrange more regular, so as to solve a series of visual defects caused by orientation difference of some liquid crystal molecules and improve the optical display characteristics of the product.

Ninth Embodiment

The present embodiment further provides a driving method of a display device, and the display device comprises the display panel of any one of the first to fourth embodiments and the sixth embodiment. When the first electrode 21 is a pixel electrode and the second electrode 22 is a common electrode, the method comprises: acquiring a common voltage and applying the common voltage to a fourth electrode 11 of the color filter substrate; with regard to each frame of image, calculating and acquiring an average value of the pixel voltages applied to all pixel electrodes when the frame image is shown, and applying the average value to a third electrode 12 of the color filter substrate.

In the present method, it is not needed to dispose thin film transistors on the color filter substrate, but it is needed to connect the third electrodes 12 of the color filter substrate with each other, so that every third electrode 12 can be applied with the average value; therefore, the mask plate used to manufacture the third electrodes is slightly different from the mask plate used to form the first electrode (pixel electrode) of the array substrate.

Certainly, the first electrode 21 may be a common electrode, while the second electrode 22 may be a pixel electrode, and in this case, the method comprises: acquiring a common voltage, and applying the common voltage to the third electrode of the color filter substrate; with regard to each frame of image, calculating and acquiring an average value of the pixel voltages applied to all the pixel electrodes when the frame image is shown, and applying the average value to the fourth electrode of the color filter substrate.

In the present method, it is not needed to dispose thin film transistors on the color filter substrate, but it is also needed to connect the fourth electrodes of the color filter substrate with each other, so that every fourth electrode can be applied with the average value; therefore, the fourth electrode can directly use an existing antistatic layer of the color filter substrate, or the mask plate used to manufacture the fourth electrode is slightly different from the mask plate used to form the first electrode (pixel electrode) of the array substrate.

The fourth electrode and the third electrode on the color filter substrate can be theoretically designed to be same as the first electrode and the second electrode of the array substrate (one of them constitutes a common electrode and the other one constitutes a pixel electrode), and the signal of every pixel become controllable via a gate line, a data line and a TFT device; however, in consideration with the implementation and convenience of the present processes, the present embodiment sets it as a uniform voltage. Specifically, the fourth electrode 11 is applied with a common voltage; the third electrodes 12 of every color filter substrate are connected together, and are all applied with signals via the compensation driving circuit, and the voltage values of the signals are obtained according to the calculation of the compensation driving circuit; the principle is to make the pixels as many as possible satisfy the requirement in which the signal levels of the first electrode of the array substrate and the third electrode of the color filter substrate approach each other. For example, when providing a certain frame of image, the compensation driving circuit detects that most pixel voltages in the panel are approximately 5V via calculation and then applies the signals of 5V to the third electrodes 12 on the color filter substrate. As illustrated by FIG. 2, at this time, the liquid crystal molecules in the cell are affected by the upper and lower electric fields, the directions of the two electric fields in the horizontal direction are same, which can enhance the driving effect of the liquid crystal molecules, while the two electric fields have an offsetting function in the vertical direction, so as to reduce the phenomenon in the traditional product that the liquid crystal molecules at edges are aligned irregularly due to the vertical fields.

Tenth Embodiment

The present embodiment further provides a driving method of a display device, and the display device comprises the liquid crystal panel of the sixth embodiment; the method comprises: in any one of the pixel regions, the third electrode is applied with the same signal as the first electrode, and the fourth electrode is applied with the same signal as the second electrode.

The color filter substrate of the liquid crystal panel of the present embodiment is provided with a third electrode and a fourth electrode thereon, and the third electrode and the fourth electrode are designed to be same as the first electrode and the second electrode of the array substrate (one of them constitutes a common electrode and the other one constitutes a pixel electrode), by a manner that the signals of every pixel become controllable via a gate line, a data line and a TFT, with regard to every pixel, the electric field generated between the third electrode and the fourth electrode and the electric field generated between the third electrode and the fourth electrode possess the vertical components in inverse directions (without consideration of distribution defects of technological parameters, the strength of the electric fields are the same), thus the method can reduce the electric field distributional differences caused by the manufacturing method, make the electric fields of the display panels corresponding to the corner regions of the glass substrate more stable and controllable, and meanwhile, can largely weaken the vertical component in the driving electric field, reduce the distributional difference of liquid crystals caused by the vertical electric field at the edge of the pixel, and make the liquid crystal molecules in the liquid crystal cell arranged more regularly, so as to solve a series of visual defects caused by orientation difference of some liquid crystal molecules and improve the optical display characteristics of the product.

The liquid crystal panel of the present embodiment needs to be provided with thin film transistors, second data lines, and second gate lines etc., the second data lines can be connected with the same driving device or driving IC as the data lines of the array substrate, and the second gate line can be connected with the same driving device or driving IC as the gate line of the array substrate; therefore, the present embodiment does not need to be provided with an additional compensation driving circuit, but the driving method of the ninth embodiment needs to be provided with an additional compensation driving circuit.

It should be noted that the technical features of the embodiments of the present invention, in the situation no conflicts occurs, can be arbitrarily combined and used.

Through the descriptions of the above embodiments, those skilled in the art can clearly understand that the present invention can be realized by software plus necessary general hardware, and certainly can be realized by hardware only; but the former is a better embodiment in many cases.

Based on this understanding, the technical solutions of the present invention substantially or the portions making contributions upon the prior art can be embodied in the form of software, the computer software product is stored in the readable storage mediums such as floppy disk, hard disk, and optical disk of the computer, which comprises a plurality of instructions to make one computer device (may be a personal computer, a server, or a network device etc.) conduct the methods of every embodiment of the present invention.

What are described above is related to the illustrative embodiments of the disclosure only and not limitative to the scope of the disclosure; the scopes of the disclosure are defined by the accompanying claims.

The invention claimed is:

1. A liquid crystal panel, comprising: an array substrate, a color filter substrate and a liquid crystal layer disposed between the array substrate and the color filter substrate, wherein the array substrate is provided with a first electrode and a second electrode thereon in different layers, the color filter substrate is provided with a third electrode and a fourth electrode thereon in different layers, the first electrode and third electrode are disposed opposite to each other, the first electrode and third electrode are slit-like electrodes, the second electrode and fourth electrode are plate-like electrodes, and the first electrode and third electrode are respectively located at sides, close to the liquid crystal layer, of the second electrode and the fourth electrode; characteristic parameters of the third electrode and characteristic parameters of the first electrode possess inverse variation trends; wherein a variation trend of a width of slit of the third electrode is contrary to a variation trend of a width of slit of the first electrode.

2. The liquid crystal panel according to claim 1, wherein the third electrode and the first electrode have a same material and technological parameters in preparation and are manufactured by using a same mask plate and a same equipment.

3. The liquid crystal panel according to claim 1, wherein the first electrode and the second electrode on the array substrate are provided with a passivation layer therebetween, the third electrode and the fourth electrode on the color filter substrate are provided with a second passivation layer therebetween, and the second passivation layer the passivation layer of the array substrate have a same material and technological parameters in preparation and are manufactured by using a same equipment.

4. The liquid crystal panel according to claim 1, wherein the fourth electrode and the second electrode have a same material and technological parameters in preparation and are manufactured by using a same equipment.

5. The liquid crystal panel according to claim 1, wherein the array substrate further comprises: a thin film transistor, a gate line, and a data line; a gate electrode of the thin film transistor is connected with the gate line, a source electrode of the thin film transistor is connected with the data line, and a drain electrode of the thin film transistor is connected with the first electrode or the second electrode; and the color filter substrate further comprises: a second thin film transistor, a second gate line, and a second data line; a gate electrode of the second thin film transistor is connected with the second gate line, a source electrode of the second thin film transistor is connected with the second data line, and a drain electrode of the second thin film transistor is connected with the third electrode or the fourth electrode.

6. The liquid crystal panel according to claim 5, wherein each of the thin film transistor and the second thin film transistor comprises: a gate electrode, a gate insulating layer, a semiconductor layer, a source electrode, and a drain electrode:

the gate electrode of the second thin film transistor and the gate electrode of the thin film transistor have an identical material and technological parameters in preparation and are manufactured by using a same equipment, the gate insulating layer of the second thin film transistor and the gate insulating layer of the thin film transistor have an identical material and technological parameters in preparation and are manufactured by using a same equipment, the semiconductor layer of the second thin film transistor and the semiconductor layer of the thin film transistor have an identical material and technological parameters in preparation and are manufactured by using a same equipment, and the source electrode and drain electrode of the second thin film transistor and the source electrode and drain electrode of the thin film transistor have an identical material and technological parameters in preparation and are manufactured by using a same equipment.

7. A driving method of a display device, wherein the display device comprises the liquid crystal panel according to claim 5; the method comprises:

in any one pixel region, the third electrode is applied with a same signal as the first electrode, and the fourth electrode is applied with a same signal as the second electrode.

8. The liquid crystal panel according to claim 1, wherein a layer where the fourth electrode is located further possess an antistatic effect.

9. A display device, comprising the liquid crystal panel of claim 1.

10. The display device according to claim 9, wherein the liquid crystal panel further comprises:

a compensation driving circuit, which is configured to, with regard to each frame of image, calculate and acquire an average value of pixel voltages applied to pixel electrodes when the frame of image is shown, and apply the average voltage to the third electrode or the fourth electrode; and where the first electrode is a pixel electrode and the second electrode is a common electrode, the compensation driving circuit is connected with the third electrode of the color filter substrate and applies the average value to the third electrode; where the second electrode is a pixel electrode and the first electrode is a common electrode, the compensation driving circuit is connected with the fourth electrode of the color filter substrate and applies the average value to the fourth electrode.

11. A driving method of the display device according to claim 10, wherein where the first electrode is a pixel electrode and the second electrode is a common electrode, the method comprises:

acquiring a common voltage and applying the common voltage to the fourth electrode of the color filter substrate, and with regard to each frame of image, calculating and acquiring an average value of pixel voltages applied to pixel electrodes when the frame of image is shown, and applying the average value to the third electrode of the color filter substrate; or where the first electrode is a common electrode and the second electrode is a pixel electrode, the method comprises:

acquiring a common voltage and applying the common voltage to the third electrode of the color filter substrate, and with regard to each frame of image, calculating and acquiring an average value of pixel voltages applied to the pixel electrodes when the frame of image is shown, and applying the average value to the fourth electrode of the color filter substrate.

12. A manufacturing method of a display device, comprising: forming an array substrate, wherein the array substrate is provided with a first electrode and a second electrode thereon in different layers, the first electrode is a slit-like electrode, the second electrode is a plate-like electrode, and the first electrode is located at one side close to a liquid crystal layer of the second electrode; forming a color filter substrate, wherein the color filter substrate is sequentially provided with a third electrode and a fourth electrode thereon, the third electrode is a slit-like electrode, the fourth electrode is a plate-like electrode, and the third electrode is respectively located at one side close to the liquid crystal layer of the fourth electrode; and cell-assembling the color filter substrate and the array substrate, wherein, after cell-assembling, characteristic parameters of the third electrode and characteristic parameters of the first electrode possess inverse variation trends; wherein a variation trend of a width of slit of the third electrode is contrary to a variation trend of a width of slit of the first electrode.

13. The method according to claim 12, wherein forming the color filter substrate comprises:

adopting a same material and technological parameters and using a same mask plate and a same equipment as the first electrode of the array substrate to form the third electrode.

14. The method according to claim 12, wherein the first electrode and the second electrode on the array substrate are provided with a passivation layer therebetween, and the third electrode and the second electrode on the color filter substrate are provided with a second passivation layer therebetween; forming the color filter substrate comprises:

adopting a same material and technological parameters and using a same equipment to form the second passivation layer and the passivation layer of the array substrate.

15. The method according to claim 12, wherein forming the color filter substrate comprises:

adopting a same material and technological parameters and using a same equipment as the second electrode of the array substrate to form the fourth electrode.

16. The method according to claim 12, wherein the array substrate further comprises: a thin film transistor, a gate line, and a data line; a gate electrode of the thin film transistor is connected with the gate line, a source electrode of the thin film transistor is connected with the data line, and a drain electrode of the thin film transistor is connected with the first electrode or the second electrode; the color filter substrate further comprises a second thin film transistor, a second gate line, and a second data line; a gate electrode of the second thin film transistor is connected with the gate line, a source electrode of the second thin film transistor is connected with the data line, and a drain electrode of the second thin film transistor is connected with the third electrode or the fourth electrode; forming the color filter substrate further comprises: adopting a same material and technological parameters and using a same equipment as the gate electrode of the array substrate to form the gate electrode of the second thin film transistor; adopting a same material and technological parameters and using a same equipment as a gate insulating layer of the array substrate to form a gate insulating layer of the second thin film transistor; adopting a same material and technological parameters and using a same equipment as a semiconductor layer of the array substrate to form a semiconductor layer of the second thin film transistor; and adopting a same material and technological parameters and using a same equipment as the source electrode and drain electrode of the array substrate to form the source electrode and drain electrode of the second thin film transistor.

* * * * *